United States Patent

White

[15] 3,662,277

[45] May 9, 1972

[54] CLOCK OSCILLATOR ARRANGEMENTS

[72] Inventor: Colin Graham White, Chelmsford, England

[73] Assignee: The Marconi Company Limited, London, England

[22] Filed: Apr. 9, 1970

[21] Appl. No.: 27,012

[30] Foreign Application Priority Data

Apr. 14, 1969 Great Britain ......................19,089/69

[52] U.S. Cl. ......................................331/2, 331/49, 331/55, 331/56, 307/269

[51] Int. Cl. ..........................................................H03b 3/04

[58] Field of Search .....................331/2, 55, 56, 49; 307/269

[56] References Cited

UNITED STATES PATENTS

| | | | |
|---|---|---|---|
| 3,297,955 | 1/1967 | Corey et al. | 331/56 |
| 3,370,251 | 2/1968 | Overstreet, Jr. | 331/2 |
| 3,479,603 | 11/1969 | Overstreet, Jr. | 307/269 |
| 3,518,567 | 6/1970 | Helgesson | 331/55 |
| 2,774,872 | 12/1956 | Howson | 331/27 |

*Primary Examiner*—John Kominski
*Attorney*—Baldwin, Wight & Brown

[57] ABSTRACT

A clock oscillator arrangement including a plurality of at least three oscillator units so arranged that at any one time one of said oscillator units acts as a master oscillator unit controlling the remaining units, the arrangement being such that upon the occurrence of a phase fault between the unit for the time being acting as the master and one of the remaining units, the unit acting as the master is changed from said one to one of the other of the remaining oscillator units.

6 Claims, 4 Drawing Figures

Figure 1:
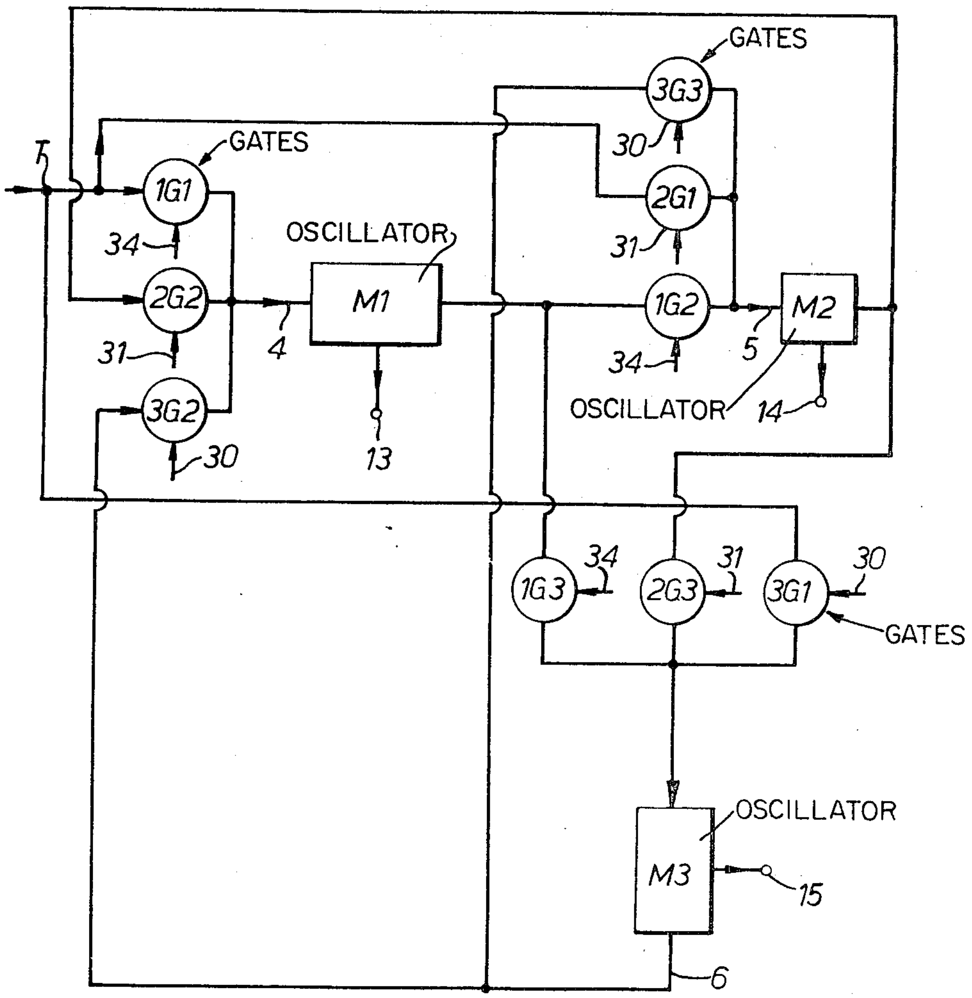

INVENTOR
Colin Graham White
BY
Baldwin Wight Diller & Brown
ATTORNEYS

INVENTOR
Colin Graham White
BY
Baldwin Wight Diller & Brown
ATTORNEYS

INVENTOR
Colin Graham White
BY
Baldwin Wight Diller & Brown
ATTORNEYS

INVENTOR
Colin Graham White
BY
Baldwin Wight Diller & Brown
ATTORNEYS

CLOCK OSCILLATOR ARRANGEMENTS

This invention relates to clock oscillator arrangements and seeks to provide improved such arrangements.

According to this invention a clock oscillator arrangement includes a plurality of at least three oscillator units so arranged that at any one time one of said oscillator units acts as a master oscillator unit controlling the remaining units, phase fault detection means adapted to detect any phase faults between the unit for the time being acting as master and any of the remaining units, and means for changing the unit acting as master from said one to one of the other of the remaining oscillator units when such a phase fault is detected. According to a feature of this invention a clock oscillator arrangement includes three oscillator units so arranged that at any one time one of said oscillator units acts as a master oscillator unit controlling the other two, phase fault detection means adapted to detect any phase faults between the unit for the time being acting as master and either one of the other two oscillator units, and means for changing the unit acting as said master from said one unit to the other of said two oscillator units when such a fault is detected.

The phase fault causing the changeover of masters may result from a fault on either the master or said one of the slave oscillator units and prior to the changeover it is not possible to determine which has caused the phase fault. After the changeover there will be a phase fault between the new master and the original fault causing oscillator unit hence determining which of the first pair of oscillators is the one causing the fault.

The oscillator unit acting as the master may itself be controlled from an external remote source of clock pulses.

Preferably each oscillator unit consists of a slave oscillator, means for relatively delaying output signals from said oscillator and signals applied to said unit to control the phase of said slave oscillator, an OR function circuit arrangement, means for applying said two relatively delayed signals to different input terminals of said OR function circuit arrangement, means for applying output of said OR function circuit arrangement to an integrating circuit, means for applying output from said integrating circuit to a voltage variable capacitor associated with the frequency determining circuit of said slave oscillator and means for deriving from said integrating circuit a control signal for controlling the changing of which of said oscillator units is for the time being acting as said master.

Preferably said control signal is derived by means including a Schmitt trigger circuit or the like, set to provide an output signal for controlling the changing of which oscillator is for the time being acting as said master when the phase difference between the output signals from the oscillator unit in question and the oscillatory source controlling it exceeds a predetermined value.

Where the oscillator unit acting as the master is itself controlled by an external remote source of clock pulses, preferably a gating circuit is provided at the control input terminal of each oscillator unit, the gating circuit at the input terminal of the oscillator unit acting as the master allowing external synchronizing pulses to be applied thereto while the gating circuits at the input terminals of the slave oscillator units allow output signals from the master oscillator unit to be applied thereto.

Where the oscillator unit acting as the master is not under external control, a gating circuit is provided at the control input terminal of each oscillator unit, the gating circuit at the input terminal of the master being arranged to cause the output of the integrator circuit for the master to be clamped to a voltage corresponding to zero phase error while the gating circuits at the input terminals of the slave oscillator units allow output signals from the master oscillator unit to be applied thereto.

Preferably said gating circuits are controlled as to their required conductive state by three pairs of "NAND" gates, each pair connected as a bistable circuit and each pair adapted to provide an output signal to open and hold open the gating circuits associated with the selection of a given oscillator unit as the master oscillator unit in dependence upon the state of the bistable circuit so formed, means being provided for changing the states of said "NAND" gate bistable circuits when the occurrence of a phase fault between the oscillator unit for the time being acting as the master and one of the other oscillator units is detected.

Preferably again, three further pairs of "NAND" gates are provided each adapted to provide a signal upon the occurrence of a phase fault associated with a different one of said oscillator units, one of the "NAND" gates of each further pair having an input terminal connected to receive an output signal from one of the "NAND" gate bistable circuits adapted to control the gates associated with the selection of one of the remaining two oscillator units and the other of the "NAND" gates of each further pair having an input terminal connected to receive an output signal from the other of the "NAND" gate bistable circuits adapted to control the gates associated with the selection of the other of the remaining two oscillator units.

Preferably again, each pair of said three further pairs of "-NAND" gates is adapted to provide a signal upon the occurrence of a phase fault associated with a different one of said oscillator units by a phase fault indicative signal passed thereto by a different one of three normally open gates, said three normally open gates being arranged to be closed together if a phase fault indicative signal passes any one of them.

Preferably again, means are provided for connecting phase fault indicative signals appearing at the input terminals of said three normally open gates to respective ones of the input terminals of three normally closed gates, the output terminals of said three normally closed gates being connected to respective ones of three warning devices, said three normally closed gates being arranged to be opened together upon the occurrence of a phase fault indicative signal associated with any of said oscillator units so that a respective one of said warning devices is activated upon the occurrence of a phase fault indicative signal associated with a respective oscillator unit.

Preferably said three normally closed gates are arranged to be opened and held open under the control of a bistable device which is connected to be set into a state in which the three normally closed gates are opened upon the passage of a phase fault indicating signal through any one of said three normally open gates.

Figure 2:
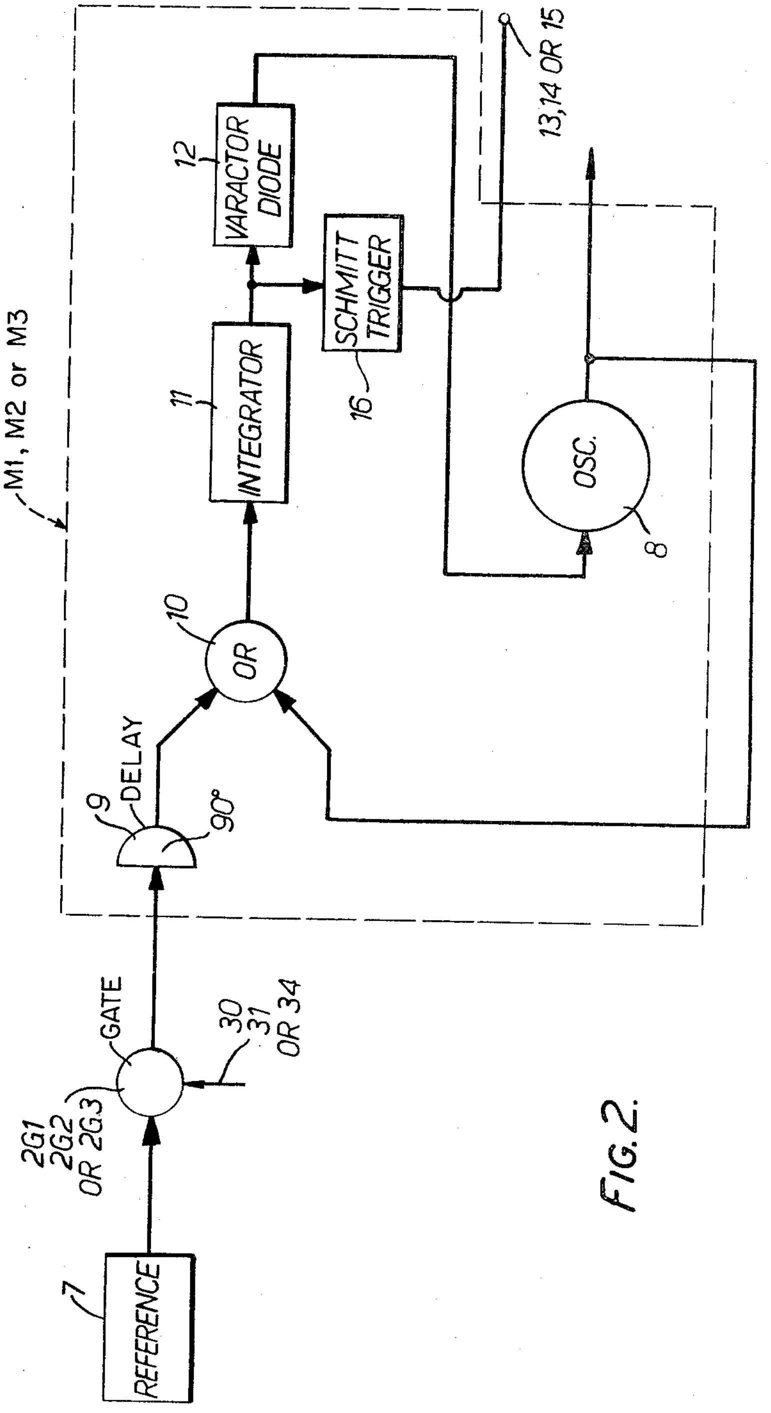
Figure 3:
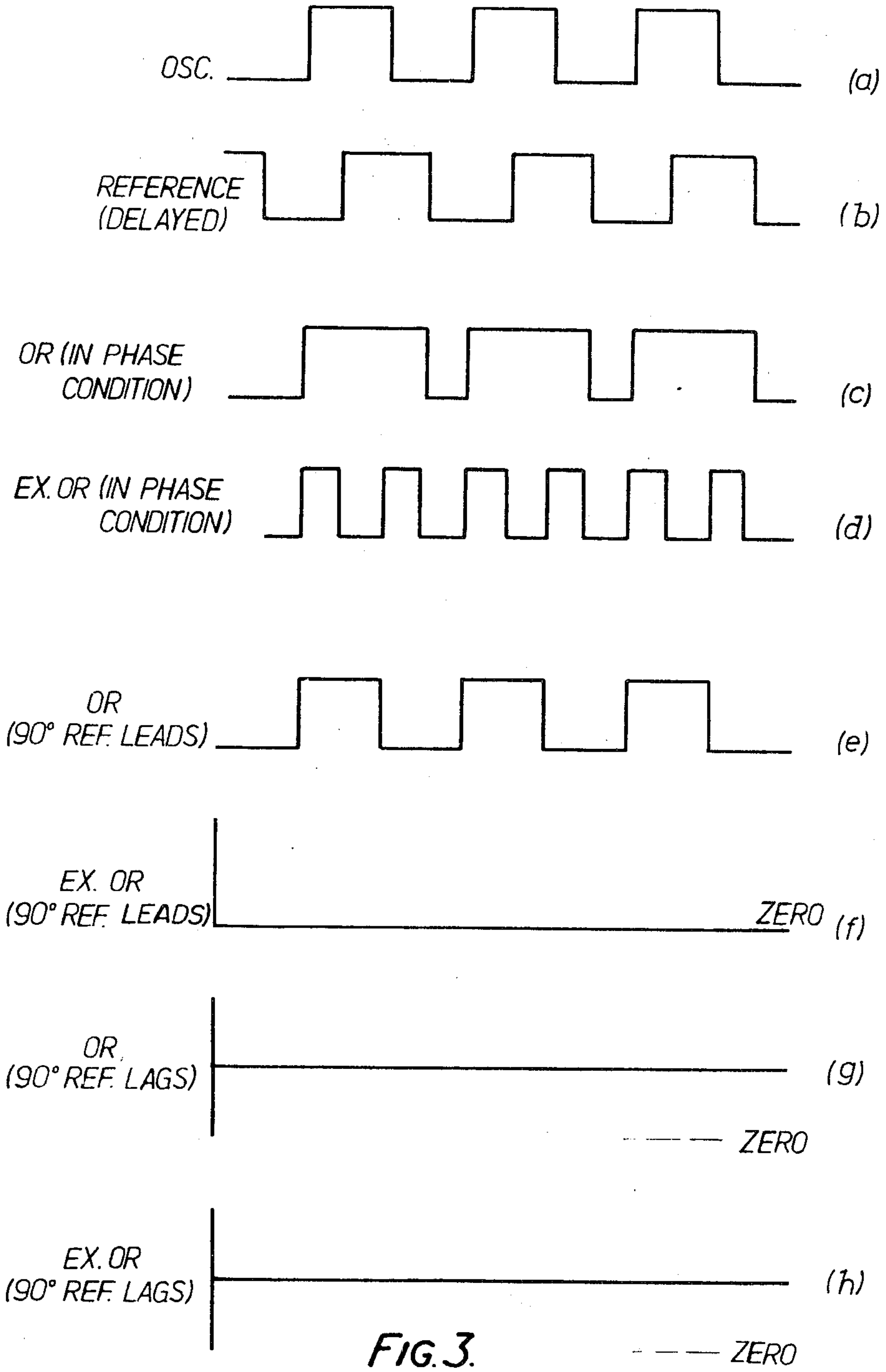
Figure 4:
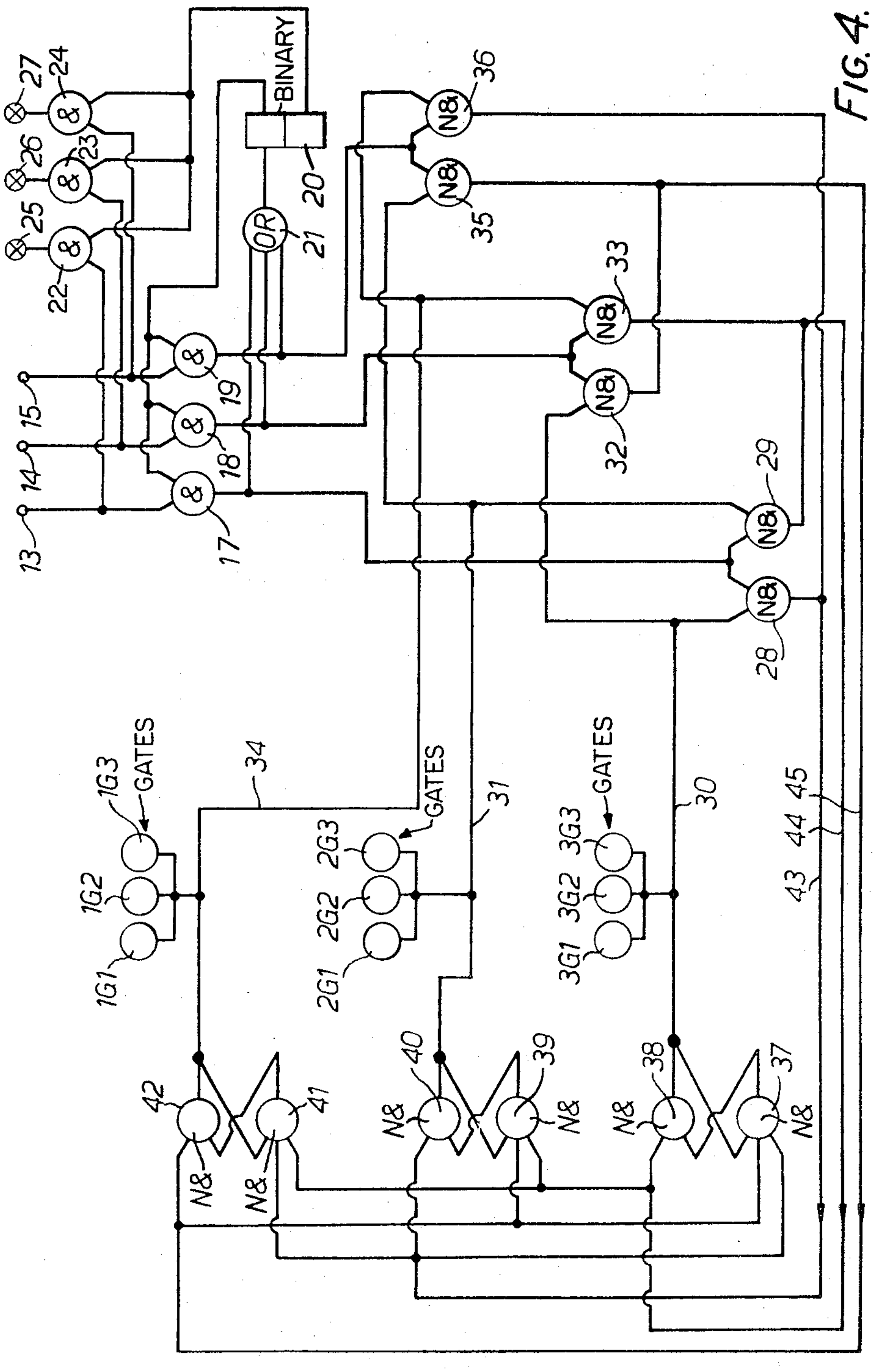

An example of triplicated clock oscillator arrangement in accordance with the present invention is illustrated in and further described with reference to the accompanying drawings, in which FIG. 1 is a block schematic diagram illustrating the interconnection of the individual oscillator arrangements, FIG. 2 is a block schematic diagram illustrating the form each individual oscillator arrangement of FIG. 1 may take, FIG. 3 shows a number of explanatory waveforms associated with FIG. 2, and FIG. 4 is a circuit diagram of a control arrangement for the various gates of FIG. 1.

Referring to FIG. 1, three stable oscillator arrangements M1, M2 and M3 are provided. Each oscillator arrangement M1, M2 and M3 is such as to be controllable over a predetermined range by reference oscillations applied to it via a control lead 4, 5 or 6 respectively. At any one time one of the oscillators M1, M2 or M3 is arranged to act as a master controlling the other two. Many forms of oscillator may be used for the oscillator arrangements 4, 5 and 6. One particular form of oscillator that may be used for this purpose is illustrated and described with reference to FIGS. 2 and 3 of the accompanying drawings.

Referring to FIGS. 2 and 3, 7 is a reference source of square waves which may be taken to be any of oscillator arrangements M1, M2 and M3 of FIG. 1 depending upon which is acting as the master. 8 is a slave oscillator producing a square wave output which is required to be maintained in phase with reference source 7. For ease of explanation it is assumed that the waves have a mark/space ratio of unity. Reference waves from reference source 7 are applied through a 90° delay unit 9 to one terminal of an OR gate 10. Output from oscillator 8 is applied to the other input terminal of OR gate 10. Waveform (*a*) of FIG. 3 shows the waveform applied from oscillator 8 to OR gate 10 and waveform (*b*) the waveform applied from the reference source 7 through delay unit 9 to the other input terminal of OR gate 10, when oscillator 8 and reference source 7 are in phase. The OR gate 10 may be a simple OR gate having a truth table as follows:

| (*a*) | (*b*) | (OUTPUT) |
|---|---|---|
| 1 | 1 | 1 |
| 0 | 1 | 1 |
| 1 | 0 | 1 |
| 0 | 0 | 0 |

It is preferred however that the OR gate 4 be what is known as an exclusive OR, or in other words a "modulo 2" gate having a truth table as follows:

| (*a*) | (*b*) | (OUTPUT) |
|---|---|---|
| 1 | 1 | 0 |
| 0 | 1 | 1 |
| 1 | 0 | 1 |
| 0 | 0 | 0 |

Waveform (*c*) of FIG. 3 shows the output derived from OR gate 10 when a simple "OR" gate is used and the oscillator 8 and the reference source 7 are in phase. Waveform (*d*) shows the output from OR gate 10 when the OR gate 10 is an "exclusive OR" or "modulo 2" and the oscillator 8 and the reference source 7 are in phase.

If one now considers a condition where the reference source 7 leads the oscillator 8 by 90° it will be seen that the output from the OR gate 10, where that gate is a simple "OR" gate, is as shown at (*e*) in FIG. 3 while waveform (*f*) of FIG. 3 shows the corresponding output if the OR gate 10 is an "exclusive OR" gate.

If a condition is now considered in which the reference source 7 is lagging the oscillator 8 by 90° the output from OR gate 10 if that gate is a simple "OR" gate will be as shown in (*g*) of FIG. 3 while (*h*) of FIG. 3 illustrates the corresponding output derived if OR gate 10 is an "exclusive OR." Thus it will be seen that between a lead of 90° and a lag of 90° of the reference source 7 compared with the oscillator 8 a range of pulse length outputs is derived at the output of OR gate 10. Where OR gate 10 is a simple "OR" gate the range of pulse length change is 180° whereas where the OR gate 10 is an "exclusive OR" the range of pulse length changes is a full 360° which is manifest in a change of output level from "1" to "0." In view of the greater range of change in output pulse length obtainable with an "exclusive OR" it is preferred to use such a gate.

The output from OR gate 10 is connected to an integrating circuit 11 and integrated output from integrator 11 applied to a varactor diode 12 which is connected in known manner to control the phase of oscillator 8.

The function of the gate reference 2G1, 2G2 or 2G3 and the control lead therefor referenced 30, 31 or 34; and the Schmitt trigger circuit 16 and the output lead referenced 13, 14 or 15 will be explained in detail with reference to FIGS. 1 and 4.

Reverting to FIG. 1, which of the oscillator arrangements M1, M2 or M3 acts as the master depends upon the state of a plurality of gates 1G1, 1G2, 1G3, 2G1, 2G2, 2G3, 3G1, 3G2 and 3G3.

Gates 1G1, 1G2 and 1G3 are connected to be opened together by signals on lead 34 by means not shown in FIG. 1 but explained hereinafter with reference to FIG. 4. Gates 2G1, 2G2 and 2G3 are similarly connected to be opened together, as are gates 3G1, 3G2 and 3G3 by signals on leads 31 and 30 respectively.

When gates 1G1, 1G2 and 1G3 are open clock pulses from an external remote source applied to terminal T pass through gate 1G1 to control oscillator arrangement M1 while output pulses from oscillator arrangement M1 pass gate 1G2 to control oscillator arrangement M2 and gate 1G3 to control oscillator arrangement M3. Gates 2G1, 2G2, 2G3, 3G1, 3G2 and 3G3 are at this time shut. In this condition oscillator arrangement M1 acts as the master.

When gates 2G1, 2G2 and 2G3 are open, the clock pulses at terminal T are applied via gate 2G1 to control oscillator arrangement M2 while output pulses from oscillator arrangement M2 pass gate 2G2 to control oscillator arrangement M1 and gate 2G3 to control oscillator arrangement M3. Gates 1G1, 1G2, 1G3, 3G1, 3G2 and 3G3 are at this time shut. In this condition oscillator arrangement M2 acts as the master.

When gates 3G1, 3G2 and 3G3 are open, the clock pulses at terminal T are applied via gate 3G1 to control oscillator arrangement M3 while output pulses from oscillator arrangement M3 pass gate 3G2 to control oscillator arrangement M1 and gate 3G3 to control oscillator arrangement M2. Gates 1G1, 1G2, 1G3, 2G1, 2G2 and 2G3 are at this time shut. In this condition oscillator arrangement M3 acts as the master.

The control of the gates 1G1, 1G2, 1G3, 2G1, 2G2, 2G3, 3G1, 3G2 and 3G3 is such that the oscillator arrangement which is for the time being the master (M1 say) remains the mater until a fault is detected between that oscillator arrangement (M1) and one (M2 say) of the other two oscillator arrangements. Upon the detection of the fault, the gates are switched (in this case 1G1, 1G2 and 1G3 are closed, 2G1, 2G2 and 2G3 remain closed and 3G1, 3G2 and 3G3 are opened) to render the remaining oscillator arrangement (M3) the master.

The control circuitry for effecting control of the gates 1G1, 1G2, 1G3, 2G1, 2G2, 2G3, 3G1, 3G2 and 3G3 will now be described with reference to FIG. 4.

Referring to FIG. 4, three terminals 13, 14 and 15 (also shown in FIG. 1) are connected to receive signals whenever oscillator arrangement M1, oscillator arrangement M2 or oscillator arrangement M3 respectively departs to a predetermined extent from the in-phase condition with the source of oscillations controlling it (which may be one of the other oscillator arrangements or the external remote source).

A suitable point in the circuitry of each oscillator arrangement for deriving such a signal is between the integrator circuit 11 and the varactor diode 12 of FIG. 2. A Schmitt trigger circuit, represented by the block 16 in FIG. 2 may be utilized to set the extent to which the phase condition between the controlled and control oscillator arrangement may depart from the in-phase condition before a response is applied to terminal 13, 14 or 15 as the case may be.

Reverting to FIG. 4, terminal 13 is connected to the first input terminal of an "AND" gate 17, terminal 14 to the first input terminal of an "AND" gate 18 and terminal 15 to the first terminal of an "AND" gate 19. The second input terminal of each of the gates 17, 18 and 19 are connected together and to a bistable circuit 20 so arranged that gates 17, 18 and 19 are normally open (i.e. conductive).

Bistable circuit 20 is controlled by an "OR" gate 21 having three input leads each connected to the output terminal of a different one of the gates 17, 18 and 19, so that if a signal appears on any of terminals 13, 14 and 15, the signal passes through one of the gates 17, 18 or 19 and the OR circuit 21 to switch bistable circuit 20 to its second state in which gates 17, 18 and 19 are closed. Thus once a signal appearing at any of terminals 13, 14 or 15 has passed through gate 17, 18 or 19, all of the last mentioned gates are inhibited against the passage of any further signals which may appear on terminal 13, 14 or 15.

Terminals 13, 14 and 15 are also connected respectively to the first input terminal of an "AND" gate 22, 23 or 24. The second input terminals of the gates 22, 23 and 24 are connected together and to the bistable circuit 20 so that when the bistable circuit 20 is switched by a signal passing "OR" gate 21, gates 22, 23 and 24 are rendered conductive.

The output terminal of gate 22 is connected to an indicator lamp 25, the output terminal of gate 23 is connected to an indicator lamp 26 and the output terminal of gate 24 is connected to an indicator lamp 27. Thus lamp 25 lights when a signal appears at terminal 13 indicating a fault associated with oscillator arrangement M1 or the reference source (which may be one of the other oscillator arrangements M2 or M3) controlling it; lamp 26 lights when a signal appears at terminal 14 indicating a fault associated with oscillator M2 or the reference source controlling it; and lamp 27 lights when a signal appears at terminal 15 indicating a fault associated with oscillator M3 or the reference source controlling it.

The output terminal of "AND" gate 17 is also connected to the first input terminals of a pair of "AND" gates 28 and 29. The second input terminal of "AND" gate 28 is connected to a lead 30 which, for reasons to be explained in detail later, exhibits a "1" signal condition when oscillator arrangement M3 is for the time being the acting master and an "0" signal condition at other times. The second input terminal of "AND" gate 29 is connected to a lead 31 which exhibits a "1" signal condition when oscillator arrangement M2 is for the time being the acting master and a "0" signal condition at other times.

The output terminal of "AND" gate 18 is also connected to the first input terminals of a pair of "NAND" gates 32 and 33. The second input terminal of "NAND" gate 32 is connected to the lead 30. The second input terminal of "NAND" gate 33 is connected to a lead 34 which exhibits a "1" signal condition when oscillator arrangement M1 is for the time being the acting master, and an "0" signal condition at other times.

The output terminal of "AND" gate 19 is connected to the first input terminals of a pair of "NAND" gates 35 and 36. The second input terminal of "NAND" gate 35 is connected to lead 31 while the second input terminal of "NAND" gate 36 is connected to lead 34.

The signal conditions of leads 30, 31 and 32 are determined by the states of three pairs of "NAND" gates 37 and 38; 39 and 40; 41 and 42.

Each pair of "NAND" gates 37, 38, 39, 40, 41, 42 are cross-connected with the output terminal of one connected to the input terminal of the other, such that the pair act as a bistable circuit, a "1" signal condition appearing on one output terminal of a "NAND" of a pair while an "0" signal condition appears on the other "NAND" gate of the pair, and vice versa.

The lead 30 is connected to the output terminal of one "-NAND" gate (38) of a first pair. The lead 31 is connected to the output terminal of one "NAND" gate (40) of a second pair and the lead 34 is connected to the output terminal of one "NAND" gate (42) of a third pair.

"NAND" gates 37, 39 and 41 each have three input terminals while "NAND" gates 38, 40 and 42 each have two input terminals.

One input terminal of each "NAND" gate of a pair is connected to the output terminal of the other "NAND" gate of the same pair as has already been mentioned.

The remaining input terminal of "NAND" gate 38, one of the remaining two input terminals of "NAND" gate 39 and one of the remaining two input terminals of "NAND" gate 41 are connected together and via lead 44 to the output terminals of "AND" gates 29 and 33.

The remaining input terminal of "NAND" gate 40, one of the remaining two input terminals of "NAND" gate 37 and the other of the remaining two input terminals of "NAND" gate 41 are connected together and via lead 43 to the output terminals of "AND" gates 28 and 36.

The remaining input terminal of "NAND" gate 42, the other of the remaining two input terminals of "NAND" gate 39 and the other of the remaining two input terminals of "-NAND" gate 37 are connected together and via lead 45 to the output terminals of "NAND" gates 32 and 35.

Gates 1G1, 1G2 and 1G3 of FIG. 1 are connected to be controlled together in dependence upon the signal state exhibited by lead 34, being opened when that state is a "1" and closed at other times.

Gates 2G1, 2G2 and 2G3 of FIG. 1 are connected to be controlled together in dependence upon the signal state exhibited by lead 31, being opened when that state is a "1" and closed at other times.

Gates 3G1, 3G2 and 3G3 of FIG. 1 are connected to be controlled together in dependence upon the signal state exhibited by lead 30, being opened when that state is a "1" and closed at other times.

The operation of FIG. 4 will now be explained. Assume that oscillator arrangement M1 is the acting master. In this condition the bistable circuits formed by "NAND" gates 37 and 38 and "NAND" gates 39 and 40 have a setting such that "0" signal conditions are maintained on leads 30 and 31 which hold gates 2G1, 2G2, 2G3, 3G1, 3G2 and 3G3 closed.

The bistable circuit formed by "NAND" gates 41 and 42 has a setting such that a "1" signal condition is maintained on lead 34 which holds gates 1G1, 1G2 and 1G3 open.

Assume now that a phase change of more than the aforementioned predetermined phase change is detected between acting master oscillator arrangement M1 and oscillator arrangement M3.

A signal will appear at terminal 15 which passes normally open gate 19, sets bistable circuit 20 to close all of the gates 17, 18 and 19 and illuminate lamp 27.

The signal appears on the first input terminals of "NAND" gates 35 and 36. Gate 35 is closed since its second input terminal is connected to lead 31 which is currently exhibiting a "0" signal condition. Gate 36 is open however since its second input terminal is connected to lead 34 which is currently exhibiting a "1" signal condition. From the output terminal of gate 36 a signal passes to lead 43 to reset the bistable circuit formed by "NAND" gates 39 and 40 and the bistable circuit formed by "NAND" gates 41 and 42 such that a "1" signal condition is now exhibited by lead 31 and a "0" signal condition is now exhibited by lead 34. The state of the bistable circuit formed by "NAND" gates 37 and 38 is, of course, not changed.

Thus gates 1G1, 1G2 and 1G3 close and gates 2G1, 2G2 and 2G3 open and oscillator arrangement M2 is elected the new acting master.

Lamp 27 will now extinguish because the fault indicating response which appeared on terminal 15 will disappear upon the selection of a new master In practice, the switching action to select a new master may be quicker than the warm-up time of the filament of lamp 27 so that this lamp may not light initially or may merely flash. Upon the election of the new master however, a further fault indicating response will appear on terminal 13 or 15 depending upon which one of the oscillator units now acting as slave oscillators is at variance with the new master (this one oscillator unit will be the faulty oscillator unit giving rise to the fault indicating response in the first instance). This further fault response cannot pass gates 17 or 19 to effect a further change of master, since these are closed, but does act to illuminate lamp 25 or 27 to provide a permanent identification of the oscillator unit (M1 or M2) which is at fault.

Corresponding action is obtained for different combinations of the oscillator arrangements for the time being acting as the master and fault conditions.

As described, once a faulty oscillator unit has been identified, the appropriate warning light 25, 26 or 27 will remain alight and gates 17, 18 and 19 closed. If desired however means may be provided for resetting bistable 20 upon the election of a new master thus extinguishing the warning lamp and re-opening gates 17, 18 and 19. This is not preferred however, since once a fault has been detected, even if it is a temporary fault, it is preferable to investigate the same before the arrangement is reset into normal operational order.

I claim:

1. In a clock oscillator system, in combination, first, second and third oscillator means each for selective operation as a master oscillator, each oscillator means comprising an oscillator having an output terminal and comparator means for producing an output signal in response to a predetermined phase difference between a pair of inputs thereto, the output terminal of each oscillator being connected as one input to its associated comparator means and control means for connecting one of said oscillator means for master oscillator operation while connecting the output terminal of the associated oscillator as the second input to each of the comparator means of the other oscillator means; and logic means for selecting one of said other oscillator means for master oscillator operation in response to an output signal from a comparator means associated with one of said other oscillator means, said logic means comprising three pairs of "NAND" gates, each pair connected as a bistable circuit and each pair adapted to provide an output signal actuating said control means in dependence upon the state of the bistable circuit so formed, and means for changing the states of said "NAND" gate bistable circuits in response to an output from one of said comparator means.

2. The clock oscillator system as defined in claim 1 wherein said logic means also includes three pairs of second NAND gates, one second NAND gate of each pair having one of the outputs of the first mentioned NAND gates as an input thereto while the other second NAND gate of each pair having another of the outputs of the first mentioned NAND gates as an input thereto, each pair of second NAND gates having a different combination of the outputs of said first mentioned NAND gates at inputs, and the two second NAND gates of each pair having common input associated with the output of one of said comparator means.

3. The clock oscillator system as defined in claim 1 including three normally open gates connecting the respective outputs of said comparator means to said pairs of second NAND gates as the respective common inputs thereto, and means for blocking all of said normally open gates in response to a comparator output signal passing any one of them.

4. The clock oscillator system as defined in claim 3 wherein the last means includes a bistable circuit.

5. The clock oscillator system as defined in claim 3 including a warning device associated with each oscillator means, and means for actuating a respective warning device in response to a comparator output passing any one of said normally open gates.

6. In a clock oscillator system, in combination, first, second and third oscillator means each for selective operation as a master oscillator, each oscillator means comprising an oscillator having an output terminal and comparator means for producing an output signal in response to a predetermined phase difference between a pair of inputs thereto, the output terminal of each oscillator being connected as one input to its associated comparator means, each comparator means including means for delaying said other input thereto, an OR function circuit receiving said one input and the delayed input, an integrating circuit receiving the output of said OR function circuit, and means for controlling the oscillator associated with the comparator means in response to the output of said integrating circuit, each comparator means also including means for producing said output signal thereof in response to output of said integrating circuit indicating said selected phase difference;

control means for connecting one of said oscillator means for master oscillator operation while connecting the output terminal of the associated oscillator as the second input to each of the comparator means of the other oscillator means;

logic means for selecting one of said other oscillator means for master oscillator operation in response to an output signal from that comparator means associated with the other of said other oscillator means; wherein said means for producing said output signal is a Schmitt trigger circuit.

* * * * *